United States Patent Office 3,165,661
Patented Jan. 12, 1965

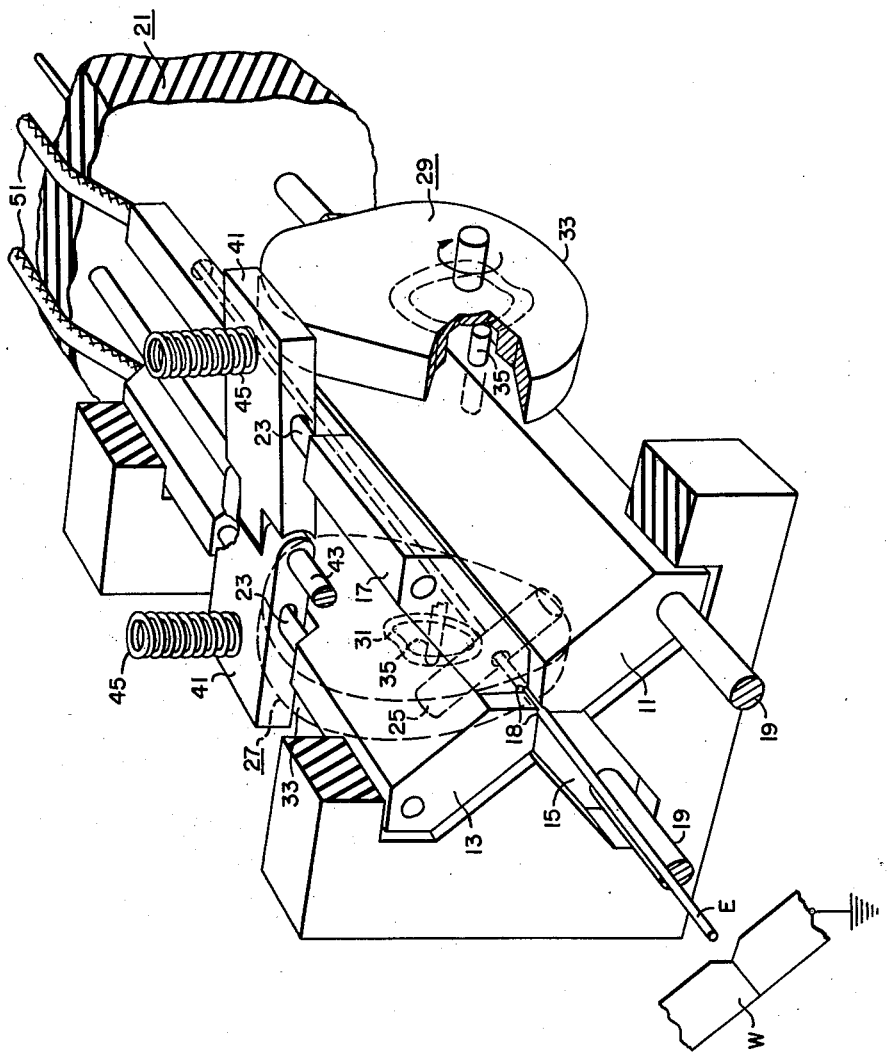

3,165,661
ARC WELDING APPARATUS
Alexander Taleff, Penn Hills, Pa., assignor to Westinghouse Electric Corporation, East Pittsburgh, Pa., a corporation of Pennsylvania
Filed May 3, 1962, Ser. No. 192,130
2 Claims. (Cl. 314—68)

This invention relates to arc welding and has particular relationship to guns or torches for advancing a consumable electrode into a welding arc where it is fused and deposited on work. In its broader aspects this invention may also relate to arc melting. To the extent that this invention is applied to arc melting the reference to arc welding in the claims is intended also to apply to arc melting.

In accordance with the teachings of the prior art the electrode is advanced by means of motor driven rollers which engage the electrode through an electrode-guide tube. The electrode-guide tube is in electrical contact with the electrode and the welding current is transmitted from the welding power supply through the electrode at this contact. This prior-art apparatus has been found unsatisfactory for welding in situations where joints of the highest purity are required; the difficulty resides in two principal causes. The regions of contact between the electrode-guide tube and the electrode change continuously and this change varies the contact resistance in series with the arc thus varying the arc current materially and deleteriously affecting the weld. The electrode becomes disconnected both from the rollers and from the electrode guide tube during short intervals and arcing from the guide tube or the drive rollers to the electrode occurs. The arc melts tiny portions of the metal of the rollers or guide tube and these are impressed in the surface of the electrode and ultimately contaminate the weld.

It is then broadly an object of this invention to eliminate the above-described deficiencies of prior art welding apparatus.

It is also an object of this invention to provide electrode-advancing apparatus which shall not depend on sliding or rolling contacts against the electrode for transmitting welding current through the electrode or for advancing the electrode.

In accordance with this invention in its specific aspects the electrode receives current through, and is advanced by, a plurality of sets of contact means each of which engages the electrode in advancing relationship during short intervals. These intervals are overlapping so that the movement of the electrode is continuous. The welding current is supplied through the contact means in parallel so that the contact means engaging the electrode shunts the other contact means and thus arcing to any contact means which is disengaged is prevented.

The novel features considered characteristic of this invention are disclosed generally above. This invention itself both as to its organization and as to its method of operation together with additional objects and advantages thereof will be understood from the following description of a specific embodiment taken in connection with the accompanying drawing, in which the single figure is a view in isometric showing a preferred embodiment of this invention.

The apparatus shown in the drawing is a gun for advancing an electrode E toward work W. An arc is produced between the electrode E and the work W melting the electrode and depositing it on the work to produce a welded joint.

This gun includes a plurality of pairs of contacts 11 and 13 and 15 and 17, respectively. Each contact 11 through 17 includes a groove 18 which projects into the region through which the electrode E is transmitted and engages the electrode. Each pair includes a laterally fixed but longitudinally slidable contact 11 and 15 and a laterally and longitudinally movable contact 13 and 17. The laterally fixed contacts are each slidable on a bar 19 connected to the walls of the enclosure 21 within which the contacts are mounted. The laterally movable contacts 13 and 17 are each slidable on a guide pin 23 which is itself laterally movable.

Each pair of opposite contacts 11 and 13 and 15 and 17 are interconnected by a pin 25. The laterally movable contacts 13 and 17 are respectively slidable along this pin 25, but the pin causes both contacts to move longitudinally together.

The movement of the pairs of contacts is controlled by a pair of synchronously operated composite cam units 27 and 29. Each cam has a groove cam surface 31 and a peripheral cam surface 33. A cam follower in the form of a pin 35 is cooperative with each groove 31. Each pin 35 is connected to an associated laterally fixed contact 11 or 15. The cam grooves 31 actuate the pin followers to cause the associated laterally fixed contacts 11 or 15 to move longitudinally. Since each contact 11, 15 is connected by the pin 35 to the associated laterally movable contacts 13 and 17 the laterally movable contacts move longitudinally with the associated laterally fixed contacts.

Each peripheral cam surface 33 is cooperative with a plate or lever 41 which is pivotal about a rod 43 secured to the end walls of the casing 21. Each lever 41 is urged into engagement with a cooperative laterally movable contact 13 and 17 respectively by a spring 45 which is compressed between a wall of the casing 21 and the top of the lever 41. During certain of its periods each peripheral cam 33 retracts the corresponding lever 41 from the associated laterally movable contact 13 or 17 compressing the spring 45 and during another portion of its motion each peripheral cam permits the spring 45 to press the associated laterally movable contacts 13 or 17 into engagement with the electrode E. The cam grooves 31 and peripheral cams 33 thus produce reciprocating longitudinal motion of the pairs of contacts 11 and 13 and 15 and 17 and coordinated inward and outward compressing and relaxing motion of the contacts 13 and 17.

The cam units 27 and 29 are alike and their motions are synchronized. Groove 31 of unit 27 moves contacts 15 and 17 toward the work W while groove 31 of unit 29 retracts contacts 11 and 13 from the work W. While contacts 15 and 17 are moving toward the work surface 33 of unit 29 causes the associated lever 41 to press the contact 17 into advancing engagement with electrode E and while contacts 11 and 13 are being retracted periphery 31 of cam 27 permits contact 13 to slide relatively to the electrode E. Conversely, when groove 31 of cam 29 causes contacts 11 and 13 to advance towards the work, periphery 33 of cam 27 produces electrode advancing engagement of contact 11 and electrode E and periphery 33 of cam 29 permits contact 15 to slide relative to electrode E as the contact is retracted. The cam grooves should be so formed that the advance of the electrode toward the work produced by each cam is uniform. In the preferred practice of this invention the cam grooves are so cut and so arranged that the operation of the cams advancing the electrode toward the work is overlapping so that there is no discontinuity in the movement of the electrode.

The electrode E is supplied with current through the contacts 11, 13, 15, 17 in parallel. For this purpose suitable flexible conductors 51 are connected to these contacts. Because of the parallel connection of the contacts arcing between any contacts 11 and 13 or 15 and 17 sliding with respect to the electrode E or slightly disengaged from electrode is precluded since the gap between any contacts and the electrode is shunted by the contacts in engagement with the electrode. Since the engagement of the contacts with the electrode takes place during overlapping intervals there is no time during which the contacts are disengaged from the electrode.

While a preferred embodiment of this invention has been disclosed herein many more modifications thereof are feasible. This invention then is not to be restricted except insofar as is necessitated by the spirit of the prior art.

I claim as my invention:

1. A gun for arc welding with a consumable electrode comprising first contact means, second contact means, means actuating said first and second contact means alternately and in overlapping relationship to engage said electrode in welding-current-transmitting and advancing relationship so as to advance said electrode continuously, and means for supplying welding current through said electrode through at least one of said contact means.

2. A gun for welding with a consumable electrode comprising first contact means, second-contact means, first cam means connected to said first contact means periodically operable during an interval to cause said first contact means to engage said electrode in welding-current-transmitting relationship and simultaneously to advance said electrode, second cam means connected to said second contact means and periodically operable during an interval to cause said second contact means to engage said electrode in welding-current-transmitting relationship and simultaneously to advance said electrode, means connected to said cam means to drive said cam means in synchronism, asid cam means being set so that the associated contact means engages and advances said electrode during alternate overlapping intervals, and means connected to said contact means for supplying current to said electrode through said cam means in parallel.

References Cited in the file of this patent

UNITED STATES PATENTS

| 307,062 | Newton | Oct. 21, 1884 |
| 1,963,915 | Kennedy et al. | June 19, 1934 |